US012100192B2

(12) United States Patent
Bai et al.

(10) Patent No.: US 12,100,192 B2
(45) Date of Patent: Sep. 24, 2024

(54) METHOD, APPARATUS, AND ELECTRONIC DEVICE FOR TRAINING PLACE RECOGNITION MODEL

(71) Applicant: Tencent Technology (Shenzhen) Company Limited, Shenzhen (CN)

(72) Inventors: Dongdong Bai, Shenzhen (CN); Yonggen Ling, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 558 days.

(21) Appl. No.: 17/374,810

(22) Filed: Jul. 13, 2021

(65) Prior Publication Data

US 2021/0342643 A1    Nov. 4, 2021

Related U.S. Application Data

(63) Continuation of application No. PCT/CN2020/087308, filed on Apr. 27, 2020.

(30) Foreign Application Priority Data

May 10, 2019    (CN) .......................... 201910390693.2

(51) Int. Cl.
*G06V 10/44*    (2022.01)
*G06F 18/214*    (2023.01)
(Continued)

(52) U.S. Cl.
CPC ........ *G06V 10/454* (2022.01); *G06F 18/2148* (2023.01); *G06N 3/08* (2013.01);
(Continued)

(58) Field of Classification Search
CPC ............... G06F 18/213; G06F 18/2148; G06F 18/21343; G06F 18/2135; G06N 3/08;
(Continued)

(56) References Cited

U.S. PATENT DOCUMENTS

| 2019/0122113 A1* | 4/2019 | Chen ...................... G06N 3/084 |
| 2019/0156178 A1* | 5/2019 | Thornton ................ G06N 3/044 |

(Continued)

FOREIGN PATENT DOCUMENTS

| CN | 103609178 A | 2/2014 |
| CN | 105550701 A | 5/2016 |
| CN | 110209859 A | 9/2019 |

OTHER PUBLICATIONS

Extended European Search Report, EP20805484.1, May 27, 2022, 11 pgs.

(Continued)

*Primary Examiner* — Qun Shen
(74) *Attorney, Agent, or Firm* — Morgan, Lewis & Bockius LLP

(57) ABSTRACT

A computer device extracts local features of sample images based on a first part of a convolutional neural network (CNN) model. The sample images comprise a plurality of images taken at the same place. The device; aggregates the local features into feature vectors having a first dimensionality based on a second part of the CNN model. The device obtains compressed representation vectors of the feature vectors based on a third part of the CNN model. The compressed representation vectors have a second dimensionality less than the first dimensionality. The device trains the CNN model, and obtains a trained CNN mode satisfying a preset condition in accordance with the training.

18 Claims, 9 Drawing Sheets

(51) Int. Cl.
  *G06N 3/08* (2023.01)
  *G06V 10/77* (2022.01)
  *G06V 10/774* (2022.01)
  *G06V 10/82* (2022.01)

(52) U.S. Cl.
  CPC ...... *G06V 10/7715* (2022.01); *G06V 10/7747* (2022.01); *G06V 10/82* (2022.01)

(58) Field of Classification Search
  CPC ........ G06N 3/045; G06N 3/084; G06N 20/10; G06V 10/454; G06V 10/7715; G06V 10/7747; G06V 10/82
  See application file for complete search history.

(56) References Cited

U.S. PATENT DOCUMENTS

| | | | | |
|---|---|---|---|---|
| 2019/0287243 | A1* | 9/2019 | Madabhushi | G06F 18/2415 |
| 2019/0310636 | A1* | 10/2019 | Halder | G05D 1/0274 |
| 2020/0012862 | A1* | 1/2020 | Mitra | G06V 20/46 |
| 2020/0021873 | A1* | 1/2020 | Swaminathan | H04N 21/466 |
| 2020/0092552 | A1* | 3/2020 | Coelho | H04N 19/147 |
| 2021/0004589 | A1* | 1/2021 | Turkelson | G06V 30/19173 |

OTHER PUBLICATIONS

Albert Gordo et al., "End-to-End Learning of Deep Visual Representations for Image Retrieval", arxiv.org, Cornell University Library, vol. 124, No. 2, Jun. 5, 2017, XP036289695, 18 pgs.
Jun Mao et al., "Learning to Fuse Multiscale Features for Visual Place Recognition", IEEE Access, vol. 7, 2019, XP011705561, 13 pgs.
Tencent Technology, WO, PCT/CN2020/087308, Jul. 29, 2020, 5 pgs.
Tencent Technology, IPRP, PCT/CN2020/087308, Nov. 16, 2021, 6 pgs.
Relja Arandjelovic et al., "NetVLAD: CNN Architecture for Weakly Supervised Place Recognition", arXiv: 1511.07247v3, M 2, 2016, 17 pgs.
Tencent Technology, ISR, PCT/CN2020/087308, Jul. 29, 2020, 2 pgs.
Chamara Kasun Liyanaarachchi Lekamalage et al., "Multi-layer Multi Objective Extreme Learning Machine", 2017 IEEE International Conference on Image Processing (ICIP), IEEE, Sep. 17, 2017, XP033322785, 2 pgs.
Tencent Technology, European Office Action, EP Application No. 20805484.1, Feb. 21, 2024, 7 pgs.

* cited by examiner

METHOD, APPARATUS, AND ELECTRONIC DEVICE FOR TRAINING PLACE RECOGNITION MODEL

CROSS-REFERENCE TO RELATED APPLICATIONS

This application is a continuation application of PCT Patent Application No. PCT/CN2020/087308, filed Apr. 27, 2020, entitled "METHOD, APPARATUS, AND ELECTRONIC DEVICE FOR TRAINING PLACE RECOGNITION MODEL," which claims priority to Chinese Patent Application No. 201910390693.2, entitled "METHOD, APPARATUS, AND ELECTRONIC DEVICE FOR TRAINING PLACE RECOGNITION MODEL", filed on May 10, 2019, all of which are incorporated by reference herein in their entirety.

FIELD OF THE TECHNOLOGY

This application relates to the field of computer technologies, and in particular, to a method, an apparatus, a computer-readable storage medium, and an electronic device for training a place recognition model.

BACKGROUND OF THE DISCLOSURE

With the advancement of image processing technologies, place recognition has been increasingly more widely used. For example, in a map application, the same location can be distinguished through the place recognition, thereby correcting possible errors in places and locations in the map creation process. For another example, in a video application, image fragments may be classified through the place recognition, and the video may be abstracted and segmented accordingly to extract essence of the video. For another example, the place recognition may further be used in the augmented reality (AR) function of various mobile applications. When a user uses a mobile terminal to take images that are seem, a corresponding image name may be determined through the place recognition, and then corresponding introduction and AR browsing functions are triggered.

The place recognition mainly faces three challenges: condition changes, perspective changes, and efficiency requirements. In order to cope with these difficulties, three types of implementation methods have been developed in the industry.

The first method is extracting features of place images based on an artificially designed descriptor. The method is robust to viewing angle changes, but cannot be automatically adjusted for changes in application scenarios.

The second method is using a pre-trained convolutional neural network (CNN) as a feature extractor of the place image. Compared with the previous method, the method improves the ability to fight against changes in conditions, but since a CNN model used in the method was originally pre-trained in other fields, performance improvement is limited.

The third method is directly using place recognition as a training target, first using a common network to extract the descriptors of the place images, and then aggregate the descriptors into feature vectors of a specific dimensionality. Such an algorithm obviously improves the robustness of place recognition to conditions and viewing angle changes, but since the obtained image features usually have a higher dimensionality, the costs of calculation processing are high, causing efficiency requirements for the place recognition difficult to be satisfied.

SUMMARY

This application provides a method, an apparatus, a computer-readable storage medium, and an electronic device for training a place recognition model.

In accordance with some embodiments of this application, a method for training a place recognition model is provided, the method including: extracting local features of sample images based on a first part of a CNN model, the sample images including at least one set of a plurality of images taken at the same place; aggregating the local features into feature vectors having a first dimensionality based on a second part of the CNN model; obtaining compressed representation vectors of the feature vectors based on a third part of the CNN model, the compressed representation vectors having a second dimensionality less than the first dimensionality; and training the CNN model with an aim of minimizing distances between the compressed representation vectors corresponding to the plurality of images taken at the same place, the training including adjusting model parameters of the first part, the second part, and the third part, and obtaining a trained CNN model satisfying a preset condition in accordance with the training.

In accordance with some embodiments of this application, a method for place recognition is provided, including: extracting compressed representation vectors from collected images by using a CNN model, the CNN model being obtained through the training according to the method for training a place recognition model; and performing the place recognition based on the extracted compressed representation vectors.

In accordance with some embodiments of this application, an apparatus for training a place recognition model is provided, including: a feature extraction module configured to extract local features of sample images based on a first part of a CNN model, the sample images including at least one set of a plurality of images taken at the same place; a feature aggregation module configured to aggregate the local features into feature vectors having a first dimensionality based on a second part of the CNN model; a feature compression module configured to obtain compressed representation vectors of the feature vectors based on a third part of the CNN model, the compressed representation vectors having a second dimensionality less than the first dimensionality; a model training module configured to: with an aim of minimizing distances between the compressed representation vectors corresponding to the plurality of images taken at the same place, adjust model parameters of the first part, the second part, and the third part until a CNN model satisfying a preset condition is obtained.

In accordance with some embodiments of this application, an apparatus (e.g., a computer device, an electronic device, etc.) for place recognition is provided, including: an extraction module configured to extract compressed representation vectors from collected images by using a CNN model, the CNN model being obtained through the training according to the method for training a place recognition model; and a recognition module configured to perform the place recognition based on the extracted compressed representation vectors.

In accordance with some embodiments of this application, a non-transitory computer-readable storage medium is provided, storing a computer program thereon, the computer program, when executed by a processor, implementing the method for training a place recognition model or the method for place recognition.

In accordance with some embodiments of this application, an electronic device (e.g., computer device) is provided, including: one or more processors; and memory storing computer-readable instructions, the computer-readable instructions, when executed by the processors, cause the processors to perform any of the methods disclosed herein.

The technical solutions provided in the embodiments of this application may include the following beneficial effects:

Based on the method for training a place recognition model provided in the embodiments of this application, by introducing a compression process capable of parameter training to the CNN model, end-to-end training of the place recognition model can be truly implemented. The obtained CNN model can directly obtain low-dimensionality image features, thereby improving the performance of place recognition.

It is to be understood that the foregoing general descriptions and the following detailed descriptions are only exemplary, and do not limit this application.

BRIEF DESCRIPTION OF THE DRAWINGS

The accompanying drawings, which are incorporated herein and constitute a part of this specification, illustrate embodiments consistent with this application and, together with the specification, serve to explain the principles of this application.

DESCRIPTION OF EMBODIMENTS

The exemplary implementations are now described comprehensively with reference to the accompanying drawings. However, the exemplary embodiments can be implemented in various forms and are not to be considered as being limited to the examples herein. Conversely, such implementations are provided to make this application more comprehensive and complete, and fully convey the concepts of the exemplary implementations to a person skilled in the art.

In addition, the described features, structures or characteristics may be combined in one or more embodiments in any appropriate manner. In the following descriptions, a lot of specific details are provided to give a comprehensive understanding of the embodiments of this application. However, a person of ordinary skill in the art is to be aware that, the technical solutions in this application may be implemented without one or more of the particular details, or another method, unit, apparatus, or step may be used. In other cases, well-known methods, apparatuses, implementations, or operations are not shown or described in detail, to avoid obscuring the aspects of this application.

The block diagrams shown in the accompanying drawing are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, but not to include all content and operations/steps, nor to be performed in the described orders either. For example, some operations/steps may be further divided, while some operations/steps may be combined or partially combined. Therefore, an actual execution order may change according to an actual case.

Figure 1:
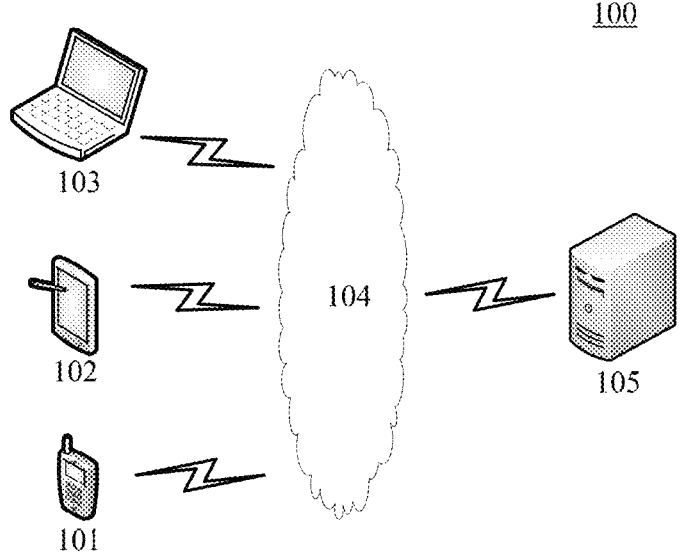
FIG. 1 shows a schematic diagram of an exemplary system architecture to which a method or apparatus for training a place recognition model or a method or apparatus for place recognition is applicable according to an embodiment of this application.

FIG. 1 shows a schematic diagram of an exemplary system architecture 100 to which a method or apparatus for training a place recognition model or a method or apparatus for place recognition is applicable according to an embodiment of this application.

As shown in FIG. 1, the system architecture 100 can include one or more of terminal devices 101, 102, and 103, a network 104, and a server 105. The network 104 is a medium configured to provide communication links between the terminal devices 101, 102, and 103, and the server 105. The network 104 may include various connection types, for example, a wired or wireless communication link, or an optical fiber cable.

It is to be understood that the quantity of terminal devices, the quantity of networks, and the quantity of servers in FIG. 1 are merely illustrative. There may be any quantities of terminal devices, networks, and servers as required. For example, the server 105 may be a server cluster including a plurality of servers.

A user may interact with the server 105 via the network 104 by using the terminal devices 101, 102, and 103, to receive or send a message. The terminal device 101, 102, 103 may be various electronic devices having display screens, including but not limited to a smartphone, a tablet computer, a portable computer, a desktop computer, or the like. The server 105 may be a server providing various services.

For example, the user uploads a sample image sequence to the server 105 by using the terminal device 103 (or the terminal device 101 or 102), and the sample image sequence includes at least one set of a plurality of images taken at the same place. The server 105 may be configured to: based on the sample image sequence, extract local features of sample images based on a first part of a CNN model; aggregate the local features into feature vectors having a first dimensionality based on a second part of the CNN model; obtain compressed representation vectors of the feature vectors based on a third part of the CNN model, the compressed representation vectors having a second dimensionality less than the first dimensionality; and with an aim of minimizing distances between the compressed representation vectors corresponding to the plurality of images taken at the same place, adjust model parameters of the first part, the second part, and the third part until a CNN model satisfying a preset condition is obtained.

As another example, the user takes an image at a certain place by using the terminal device 101 (or the terminal device 102 or 103), and uploads the image to the server 105. The server 105 uses the above trained CNN model to extract compressed representation vectors from the image, and performs the place recognition based on the extracted compressed representation vectors.

In some embodiments, the method for training a place recognition model or the method for place recognition provided in the embodiments of this application is generally performed by the server 105. Accordingly, the apparatus for training a place recognition model or the apparatus for place recognition is generally disposed in the server 105. In some other embodiments, some terminals may have functions similar to those of a server to perform the method. Therefore, the method for training a place recognition model or the method for place recognition provided in the embodiments of this application is not limited to be performed on a server side.

Figure 2:
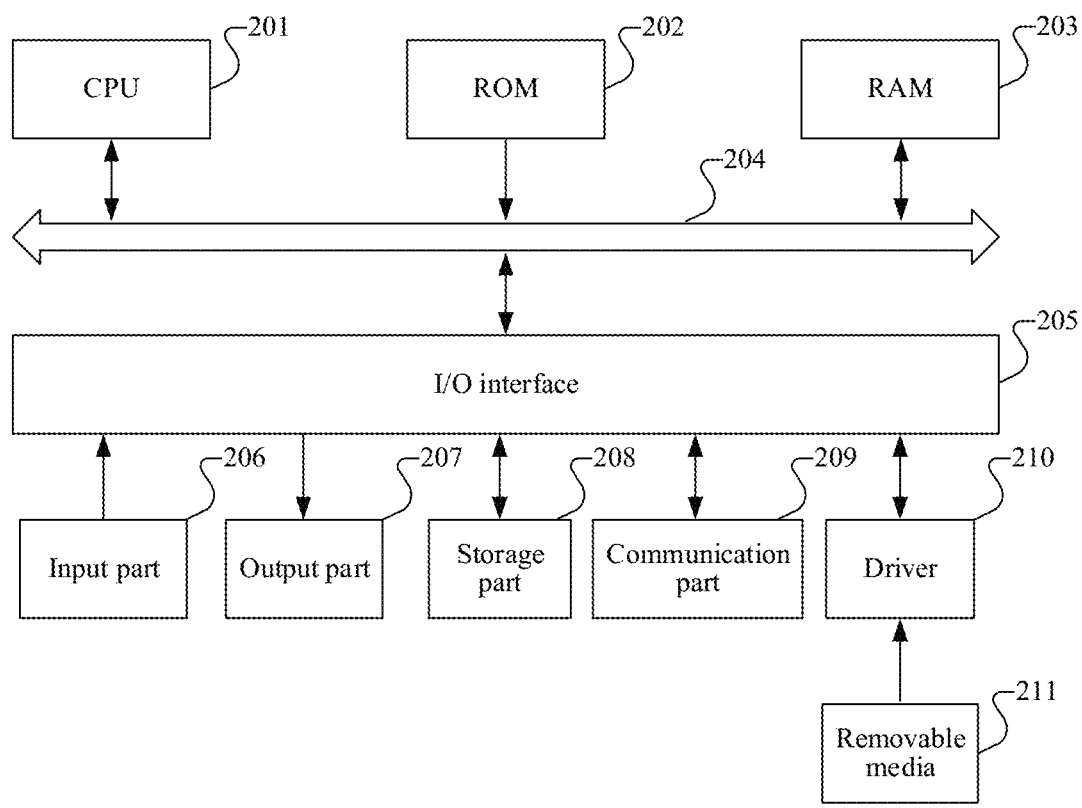
FIG. 2 shows a schematic structural diagram of a computer system of an electronic device adapted to implement an embodiment of this application.

FIG. 2 is a schematic structural diagram of a computer system adapted to implement an electronic device according to an embodiment of this application.

The computer system 200 of the electronic device shown in FIG. 2 is merely an example, and does not constitute any limitation on functions and use ranges of the embodiments of this application.

As shown in FIG. 2, the computer system 200 includes a central processing unit (CPU) 201, which can perform various appropriate actions and processing according to a program stored in a read-only memory (ROM) 202 or a program loaded into a random access memory (RAM) 203 from a storage part 208. The RAM 203 further stores various programs and data required for operating the system. The CPU 201, the ROM 202, and the RAM 203 are connected to each other via a bus 204. An input/output (I/O) interface 205 is also connected to the bus 204.

The following components are connected to the I/O interface 205: an input part 206 including a keyboard, a mouse, or the like; an output part 207 including a cathode ray tube (CRT), a liquid crystal display (LCD), a speaker, or the like; a storage part 208 including a hard disk or the like; and a communication part 209 of a network interface card, including a LAN card, a modem, or the like. The communication portion 209 performs communication processing over a network such as the Internet. A driver 210 is also connected to the I/O interface 205 as needed. A removable medium 211, such as a magnetic disk, an optical disc, a magneto-optical disk, or a semiconductor memory, is installed on the driver 210 as required, so that a computer program read from the removable medium is installed into the storage part 208 as required.

Particularly, according to the embodiments of this application, the processes described in the following by referring to the flowcharts may be implemented as computer software programs. For example, the embodiments of this application include a computer program product, the computer program product includes a computer program carried on a computer-readable medium, and the computer program includes a program code used for performing the methods shown in the flowcharts. In such an embodiment, the computer program may be downloaded and installed from a network by using the communication part 209, and/or installed from the removable medium 211. When the computer program is executed by the CPU 201, the various functions defined in the system of this application are executed.

The non-transitory computer-readable storage medium according to this application may be a computer-readable signal medium or a computer-readable storage medium or any combination of the two media. The computer-readable storage medium may be, for example, but is not limited to, an electric, magnetic, optical, electromagnetic, infrared, or semi-conductive system, apparatus, or component, or any combination thereof. More specific examples of the computer readable storage medium may include, but are not limited to: an electrical connection having one or more wires, a portable computer disk, a hard disk, a random access memory (RAM), a read-only memory (ROM), an erasable programmable read only memory (EPROM or a flash memory), an optical fiber, a portable compact disk read-only memory (CD-ROM), an optical storage device, a magnetic storage device, or any suitable combination thereof. In this application, the computer-readable storage medium may be any tangible medium including or storing a program, and the program may be used by or used in combination with an instruction execution system, apparatus, or device. In this application, a computer-readable signal medium may include a data signal being in a baseband or propagated as a part of a carrier wave, the data signal carrying a computer-readable program code. A data signal propagated in such a way may assume a plurality of forms, including, but not limited to, an electromagnetic signal, an optical signal, or any appropriate combination thereof. The computer-readable signal medium may further be any computer-readable medium in addition to a computer-readable storage medium. The computer-readable medium may send, propagate, or transmit a program that is used by or used in combination with an instruction execution system, apparatus, or device. The program code included in the readable storage medium may be transmitted using any suitable medium, including but not limited to: a wireless medium, a wired medium, an optical cable, RF, or any suitable combination thereof.

The flowcharts and block diagrams in the accompanying drawings illustrate exemplary system architectures, functions, and operations that may be implemented by a system, a method, and a computer program product according to various embodiments of this application. In this regard, each box in a flowchart or a block diagram may represent a module, a program segment, or a part of a code. The module, the program segment, or the part of the code includes one or more executable instructions used for implementing designated logic functions. In some implementations used as substitutes, functions annotated in boxes may alternatively occur in a sequence different from that annotated in an accompanying drawing. For example, two boxes shown in succession may actually be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Related units described in the embodiments of this application may be implemented in a software manner, or may be implemented in a hardware manner, and the unit described can also be set in a processor. Names of the units do not constitute a limitation on the units in a specific case.

According to another aspect of the present disclosure, a non-transitory computer-readable storage medium is provided. The computer-readable storage medium may be included in the electronic device described in the foregoing embodiments, or may exist alone and is not disposed in the electronic device. The computer-readable storage medium carries one or more programs, the one or more programs, when executed by the electronic device, causing the electronic device to implement the method described in the following embodiments. For example, the electronic device may implement the steps shown in FIG. 3 to FIG. 6.

According to the solutions shown in the various embodiments of this application, accurate image feature extraction may be performed through artificial intelligence (AI). Before the technical solutions of the embodiments of this application are described in detail, some related technical solutions, terms, and principles are introduced below.

Artificial Intelligence AI

AI involves a theory, a method, a technology, and an application system that use a digital computer or a machine controlled by the digital computer to simulate, extend, and expand human intelligence, perceive the environment, acquire knowledge, and use knowledge to obtain an optimal result. In other words, AI is a comprehensive technology in computer science and attempts to understand the essence of intelligence and produce a new intelligent machine that can react in a manner similar to human intelligence. AI is to study design principles and implementation methods of various intelligent machines, so that the machines have functions of perception, reasoning, and decision-making.

The AI technology is a comprehensive discipline and relates to a wide range of fields including both hardware-level technologies and software-level technologies. Basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning (ML)/deep learning.

Computer Vision (CV)

CV is a science that studies how to use a machine to "see". To be more specific, CV performs recognition, tracking, and measurement on a target using a camera and a computer instead of human eyes, and further performs graphics processing, so that the computer processes the target into an image suitable for human eyes to observe, or an image suitable for being transmitted to an instrument for detection. As a scientific discipline, CV studies related theories and technologies and attempts to establish an AI system that can obtain information from images or multidimensional data. The CV technologies usually include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, or map construction, and further include biological feature recognition technologies such as common face recognition and fingerprint recognition.

Machine Learning (ML)

Machine learning is an interdisciplinarity involving a plurality of disciplines such as the probability theory, statistics, approximation theory, convex analysis, algorithm complexity theory, and the like. The ML specializes in studying how a computer simulates or implements a human learning behavior to obtain new knowledge or skills, and reorganize an existing knowledge structure, so as to keep improving performance of the computer. The ML, as the core of AI, is a basic way to make the computer intelligent, and is applicable to various fields of AI. The ML and deep learning generally include technologies such as an artificial neural network, a belief network, reinforcement learning, transfer learning, inductive learning, and learning from demonstrations.

Convolutional Neural Network (CNN)

The CNN is a multi-layer supervised learning neural network, commonly used to deal with image-related machine learning problems.

A typical CNN consists of a convolutional layer, a pooling layer, and a fully connected layer (Fully Connection). A low hidden layer is generally composed of the convolutional layer and the pooling layer alternately. The role of the convolutional layer is to enhance original signal characteristics of the image and reduce noise through convolution operations. The role of the pooling layer is to reduce an amount of calculation according to the principle of image local correlation while maintaining image rotation invariance. The fully connected layer is located at a high layer of the CNN, of which inputs are feature images obtained through feature extraction of the convolutional layer and the pooling layer, and an output may be connected to a classifier to classify the input image by using logistic regression, Softmax regression, or a support vector machine (SVM).

The training process of the CNN generally uses the gradient descent method to minimize the loss function. Through a loss layer connected after the fully connected layer, weight parameters of all layers in the network are adjusted through backpropagation layer by layer, and the accuracy of the network is improved through frequent iterative training. A training sample set of the CNN is usually composed of vector pairs in the form of "an input vector, an ideal output vector". Before starting training, the weight parameters of all of the layers of the network may be initialized with some different small random numbers. Since the CNN may be regarded as input-to-output mapping in essence and can learn a large quantity of mapping relationships between an input and an output without requiring any precise mathematical expressions between the input and the output, the CNN may be trained by using the training sample set composed of the known vector pairs, so that the CNN has the mapping ability between the input and the output.

Place Recognition

In terms of application scenarios, place recognition is often used for loopback detection and image-based localization in simultaneous localization and mapping (SLAM).

In the visual SLAM problem, estimation of poses is often a recursive process, that is, a pose of a current frame is calculated according to a pose of a previous frame. In this way, transmission of frame by frame inevitably causes cumulative errors. The key to loopback detection is how to effectively detect that a camera passes through the same place, which is related to correctness of the estimated track and the map over a long period of time. Since loopback detection provides the correlation between current data and all historical data, the cumulative error generated by the SLAM front end may be greatly reduced, and a geometrically consistent map can be built. Place recognition is to identify whether the camera returns to the same place in the loopback detection. With the effect of correcting the cumulative error of the visual SLAM front end, the loopback detection may be applied to an AR-related application to correct the problems of inaccurate poses and loss of localization caused by the long-term operation of a visual odometer.

The image-based localization is to obtain a corresponding geographic location of the image according to the image, which may also be used in wide application scenarios. For example, pictures taken by a terminal may be uploaded to an image database or a search engine marked with a geographic location, and a high-precision geographic location corresponding to a photographer can be obtained through the place recognition technology. The image-based localization, for example, may play a role in places with weak GPS signals or complex terrain. In this case, mobile phone localization inevitably fails, so that a mobile phone may be used to take a picture of the current location and obtain accurate localization through the place recognition technology.

In terms of technical implementation, the purpose of place recognition is to identify a spatial location corresponding to a queried image. For an image database with a marked location and a to-be-queried image, the place recognition is to project the images onto a feature space through an image feature extractor, and then calculate similarities between image features of the to-be-queried image and sample images in the database. When the similarities between the to-be-queried image and the most similar image in the database satisfies a certain threshold, a location of the image in the database is considered to be a location of the to-be-queried image. Therefore, the most critical part in the place recognition is to obtain an appropriate image feature extractor.

The construction of the image feature extractor is usually modelled as an example retrieval problem, mainly including three steps: first extracting a local descriptor of an image; then aggregating the local descriptor into feature vectors having a fixed dimensionality; and finally compressing the feature vectors to an appropriate dimensionality.

However, as described in the background art, the training-based place recognition algorithm in the related art performs training only for the first two steps, and the final step of feature compression is only used as a post-processing process upon completion of the model training. In this way, the feature dimensionality of the image outputted by the model is very high, which may cause two problems. The first problem is easily fall into a dimensionality catastrophe effect, which causes over-fitting of the algorithm, and may reduce discrimination of a Euclidean distance and deteriorate the performance of the model. The second problem is to directly use high-dimensionality image features to calculate the similarity between images, which is too expensive to calculate. However, obtaining the high-dimensionality image features and using compression algorithms for post-processing usually takes a longer time for calculation and cannot achieve efficiency requirements for place recognition.

In order to solve the above problems, an embodiment of this application provides a method, an apparatus, a computer-readable storage medium, and an electronic device for training a place recognition model.

The implementation details of the technical solution of this embodiment of this application are described in detail in the following.

Figure 3:
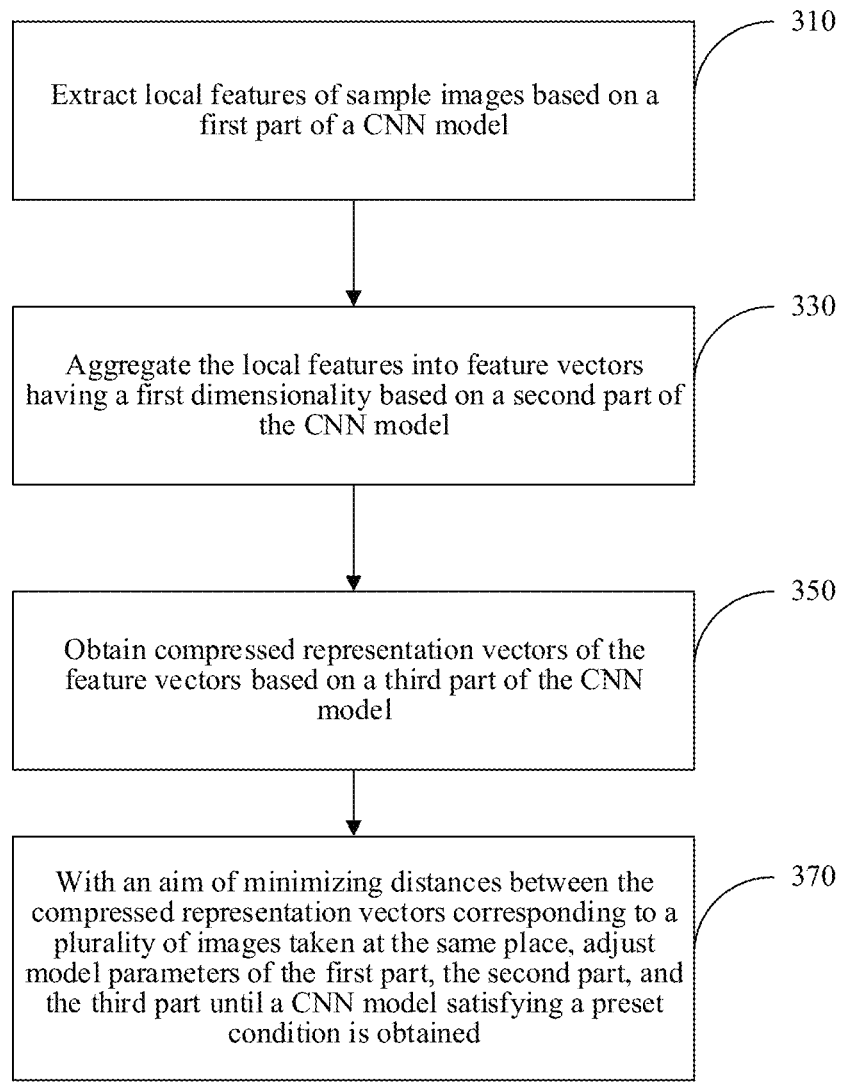
FIG. 3 is a flowchart of a method for training a place recognition model according to an exemplary embodiment.

FIG. 3 is a flowchart of a method for training a place recognition model according to an exemplary embodiment. As shown in FIG. 3, the method for training a model may be performed by any computing device, and may include the following steps 310 to 370.

In step 310, local features of sample images are extracted based on a first part of a CNN model.

The sample images herein include at least one set of a plurality of images taken at the same place. In some embodiments, the sample images include a plurality of sets of images taken at different places, and each of the sets of images includes the plurality of images taken at the same place.

As described above, the purpose of place recognition is to identify a spatial location corresponding to a queried image. Therefore, the sample images used for training the model may carry marked geographic location information, for example, GPS information.

For example, for one image in the sample image, the plurality of images in the sample images taken at the same place as the sample images may be marked as positive samples, and the plurality of images taken at a different place from the sample images may be marked as negative samples. The training process of the place recognition model is to continuously adjust the model parameters to minimize a distance between vector representation of each image in the sample images and positive sample vector representation of the finally obtained model, and a distance between the vector representation of each image and negative sample vector representation satisfies a preset boundary.

The same and different taking places in the embodiments of this application are just for ease of description, and do not indicate that the location information of the images is completely consistent. In some embodiments, the same taking place indicates that a difference between geographic location information (such as GPS information) of the two images is less than a first preset value, and the different taking places indicate that the difference between the geographic location information (such as GPS information) of the two images is greater than a second preset value.

Carrying on with the above, in a general sense, the feature extraction herein is a primary operation in image processing. In other words, feature extraction is first operation processing performed on an image, which is mainly used for determining whether each pixel represents a feature. As a prerequisite operation for feature extraction, the input sample images may further be smoothed in a scale space by using a Gaussian blur kernel, and then one or more features of the image can be calculated through local derivative operation.

The local features herein are, as a whole, some differences from surroundings of the image in the image. The local features are usually used for describing a specific area in the image, so that the image can be highly distinguishable. Therefore, the above feature extraction is essentially to extract the local features of the image, and the result directly determines the performance of subsequent image classification and recognition.

In the field of image processing, computer vision research has long focused on image feature extractors based on manual calibration such as scale-invariant feature transform (SIFT), histogram of oriented gradient (HOG), and the like. For example, the first place recognition implementation in the background art is extracting features of images based on an artificially designed descriptor.

With the deepening of deep learning research, automatic feature extraction is increasingly more commonly used as a basic layer in the image processing, and numerous feature extraction network models such as AlexNet and VGGNet have been produced accordingly. The models gradually replace the manually calibrated feature image extractor, achieving automatic learning and extraction of image features. For example, the second and third place recognition implementations mentioned in the background art adopt a trainable CNN model to automatically learn and extract the image features.

In some embodiments, in step 310, a part of the trainable CNN model is used to implement feature extraction of the sample images to obtain the local descriptor of the sample image.

As shown in FIG. 3, in step 330, local features are aggregated into feature vectors having a first dimensionality based on a second part of the CNN model.

In the actual application of place recognition, the feature of the to-be-queried image needs to be compared with features of massive images in the database. Although the local descriptor obtained in step 310 is already feature representation of the sample image, even if each descriptor only needs a few bits in size, considering a quantity of descriptors corresponding to each image and a quantity of images in the database, direct performing of the place recognition of the to-be-queried image based on the local descriptor is difficult to achieve in a short enough time. Therefore, in the embodiment of this application, the local descriptors are aggregated in step 330, and the goal is to aggregate the descriptors into vectors of a specific dimensionality.

Aggregation algorithms used in the related art include a bag-of-words (BoW) algorithm, a Fisher vector (FV) algorithm, a vector of locally aggregated descriptors (VLAD) algorithm, and the like. The core concept of the BoW method is to extract key point descriptors and train a codebook by clustering, and then represent a picture based on a quantity of times for which descriptor vectors in each picture appear in center vectors in the codebook. The core concept of the FV method is to use a Gaussian mixture model to represent each image by calculating parameters such as a mean value, covariance, and the like in the model. VLAD is a description pooling method widely used in example retrieval and image classification, which is used for capturing statistical information of local features in the image aggregated in the image. Different from recording the quantity of occurrences of the vectors by the BoW, the VLAD records a residual sum of each descriptor vector. The VLAD is used as an example below to describe the general process of aggregation of local features.

N D-dimensionality local image descriptors $x_i$ serve as an input, K clustering centers $c_k$ serve as parameters of the VLAD, and an output of the VLAD is a K×D-dimensionality image description vector. For convenience, V is a K×D matrix, the matrix is converted to vector representation and then normalized. The calculation formula is as follows:

$$V(j,k)=\Sigma_{i=1}^{N} a_k(x_i)(x_i(j)-c_k(j)) \quad (1)$$

$x_i(j)$ and $c_k(j)$ respectively represent an $i^{th}$ local descriptor and a $j^{th}$ eigenvalue of the $k^{th}$ clustering center. $a_k(x_i)$ may be understood as a weight of an $i^{th}$ local feature belonging to a $k^{th}$ cluster. In other words, when the value of $a_k(x_i)$ is 1, it indicates that the feature belongs to the cluster of the clustering, and when the value is 0, the feature does not belong to the cluster. Intuitively, V(j, k) represents a sum of residuals $(x_i-c_k)$ of all local features on each clustering cluster.

For the conventional VLAD, since the value of $a_k(x_i)$ can only be 1 or 0, which is a discontinuous value, training cannot be directly performed through backpropagation in the CNN model. Other aggregation algorithms such as the BoW and FV also have similar problems.

To this end, in some embodiments, in step 330, a part of a trainable CNN model is adopted to implement local feature aggregation, and the local features obtained in step 310 are aggregated into the feature vectors having the first dimensionality.

As shown in FIG. 3, in step 350, compressed representation vectors of the feature vectors are obtained based on a third part of the CNN model.

The compressed representation vectors herein have a second dimensionality less than the first dimensionality.

The feature vectors obtained after performing local feature aggregation based on step 320 usually still have a relatively high dimensionality, which is difficult to meet the efficiency requirement of place recognition, and it is easy to fall into a dimensionality disaster and cause the generalization performance of the image feature to decrease.

To this end, the embodiment of this application performs dimensionality reduction on the above feature vectors in step 350.

Simply put, dimensionality reduction is a preprocessing method for high-dimensionality feature data. The purpose is to remove noise and unimportant features from high-dimensionality data, and retain some of the most important features, so as to improve the speed of data processing. In an image processing scenario, dimensionality reduction can save a lot of processing time while keeping information loss within a certain range. Related dimensionality reduction algorithms include singular value decomposition (SVD), principal component analysis (PCA), factor analysis (FA), independent component analysis (ICA), and the like. The PCA is used as an example below to describe the general process of compression through dimensionality reduction.

Assuming that a trainable VLAD network is used for local feature aggregation in step 330, as described above, each image outputs an image description vector having a K×D dimensionality (that is, the first dimensionality). A set of sample images including M images is given, and a feature representation matrix corresponding to the entire image set is $X \in R^{(K \times D) \times M}$.

It is assumed that the goal of the PCA is to obtain compressed representation vectors of a dimensionality L (that is, the second dimensionality). First, a matrix X' is obtained after a mean value is subtracted from a matrix X. Then, eigenvalues and orthogonal unit eigenvectors of a covariance matrix of the matrix X' are calculated, obtained unit eigenvectors corresponding to the first L eigenvalues are first L principal components corresponding to the matrix X, and the resulting matrix may be expressed as $T \in R^{(K \times D) \times L}$. Finally, a transposed $T^T$ of a matrix T is multiplied by the matrix X to obtain the compressed representation $Y \in R^{L \times M}$ of the entire image set.

The above conventional PCA algorithm is not a differentiable process, and therefore training cannot be directly performed through backpropagation in the CNN model. Other dimensionality reduction algorithms such as SVD, FA, and ICA also have similar problems.

To this end, in some embodiments, in step 350, a part of a trainable CNN model is adopted to implement dimensionality reduction, and dimensionality reduction is performed on the feature vectors obtained in step 330 to obtain the compressed representation vectors with a smaller dimensionality.

As shown in FIG. 3, in step 370, with an aim of minimizing distances between the compressed representation vectors corresponding to the plurality of images taken at the same place, model parameters of the first part, the second part, and the third part are adjusted until a CNN model satisfying a preset condition is obtained.

In some embodiments, the CNN model herein may adopt a typical network structure. The first part, the second part, and the third part mentioned above may respectively include one or more layers of a convolutional layer, a pooling layer, a fully connected layer, and a Softmax layer. For example, the first part may include the convolutional layer and the pooling layer, the second part may include the Softmax layer, and the third part may include the fully connected layer.

As an example of model training, after random initial values are assigned to the parameters of the convolutional layer and the fully connected layer, the sample images of step 310 are inputted into the model, and the corresponding compressed representation vectors may be extracted through steps 330, 350, and 370. Joint loss calculated based on the Softmax layer is back propagated through the model, the parameters of the convolutional layer and the fully connected layer may be updated, and the sample images are inputted to the model with the updated parameters, which is iteratively performed until the preset convergence conditions are satisfied, so that a trained CNN model can be obtained.

Based on the model training method provided in the embodiments of this application, by introducing a compression process capable of parameter training to the CNN model, end-to-end training of the place recognition model can be truly implemented. The obtained CNN model can directly obtain low-dimensionality image features, thereby improving the performance of place recognition.

Figure 4:
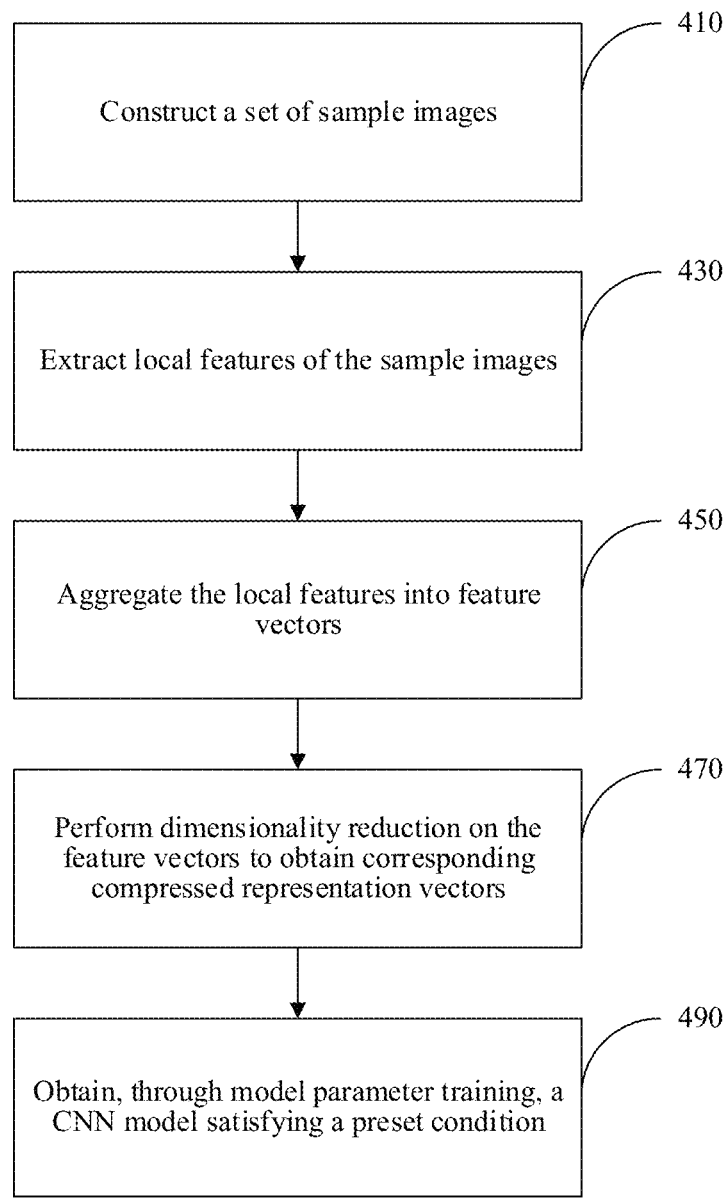
FIG. 4 is a flowchart of a method for training a place recognition model according to another exemplary embodiment.

FIG. 4 is a flowchart of a method for training a place recognition model according to another exemplary embodiment. As shown in FIG. 4, the method for training a model may be performed by any computing device, and may include the following steps 410 to 490.

In step 410, a set of sample images is constructed.

In some embodiments, in step 410, a public image database may be used to construct the set of sample images, for example, including but not limited to Pitts250k, Pitts30k, Tokyo™, and the like.

Pitts250k includes 250k database images collected from Google Street View and 24k queried images generated from Street View, and the images were captured at different times several years apart. The image set may be divided into three roughly equal parts respectively used for training, validation, and testing. Each part includes about 83k database images and 8k queried images, and there is no intersection between the three parts.

Pitts30k is a subset of Pitts250k, which is used by a plurality of algorithms due to a function of accelerating training. The image set is also composed of three parts respectively used for training, validation, and testing. Each set includes 10k database images, and there is no geographic intersection.

Tokyo™ is obtained by collecting Google Street View panoramas and cutting each panorama into 12 images with different perspectives, and also includes photos captured at different times and at the same place. Therefore, Tokyo™ is adapted to evaluate the robustness of place recognition algorithms against changes in conditions and viewing angles, which includes two parts: a training set and a validation set.

As shown in FIG. 4, in step 430, local features of the sample images are extracted.

In some embodiments, in step 430, VGGNet may be used for extracting local features of the extracted sample image.

VGGNet is a deep CNN structure developed by researchers from the University of Oxford Computer Vision and Google DeepMind, which builds CNN structure with a depth up to 19 layers by repeatedly stacking a 3*3 small convolution kernel and a 2*2 maximum pooling layer.

VGGNet uses 3*3 convolution kernels and 2*2 pooling kernels to improve performance by continuously deepening the network structure. Since the parameter quantity is mainly concentrated in the last three fully connected layers, an increase in the quantity of network layers does not bring about an explosion in the parameter quantity. In addition, the concatenation of two 3*3 convolutional layers is equivalent to a 5*5 convolutional layer, and the concatenation of three 3*3 convolutional layers is equivalent to a 7*7 convolutional layer. In other words, a size of a receptive field of the three 3*3 convolutional layers is equivalent to a 7*7 convolutional layer, but the parameter of the former is only about half of the latter, and the former may have three nonlinear operations, while the latter has only one non-linear operation, so that the former has a stronger ability to learn features.

In addition, VGGNet also increases linear transformation by using a 1*1 convolutional layer, and a quantity of outputted channels is not changed. The 1*1 convolutional layer is often used for extracting features, that is, the features of a plurality of channels are combined to condense the output of a larger channel or a smaller channel, and the size of each picture remains unchanged. In some derivative network structures, the 1*1 convolutional layer may further be used to replace the fully connected layer.

VGGNet includes a plurality of levels of networks, ranging from 11 to 19 layers in depth. The more commonly used networks are VGGNet-16 and VGGNet-19. VGGNet divides the network into 5 segments, each of the segments includes a plurality of 3*3 convolutional networks connected in series, each of the segments is convolved followed by a maximum pooling layer, and the last is 3 fully connected layers and a Softmax layer.

In other words, the first part of the CNN model in the embodiment of this application may be implemented based on VGGNet. In one embodiment, in order to connect the second part to the third part of the subsequent CNN model, the last layer in the above VGGNet basic network may be removed.

As shown in FIG. 4, in step 450, local features are aggregated into feature vectors.

As described in the previous embodiment, due to the discontinuous value of the weight parameter $a_k(x_i)$, the conventional VLAD cannot be directly connected to the CNN model for training. Therefore, in some embodiments, in step 450, the improved netVLAD may be used to perform local feature aggregation.

In some embodiments, the netVLAD adopts an approximate method to perform soft assignment on the weight parameter $a_k(x_i)$, as shown in the following formula:

$$\bar{a}_k(x_i) = \frac{e^{-\alpha\|x_i-c_k\|^2}}{\sum_{k'} e^{-\alpha\|x_i-c_{k'}\|^2}} \quad (2)$$

The above weight assignment may be regarded as a fuzzy clustering assignment method, and a probability function weight is generated according to a distance from each local feature to the clustering center. For a local feature descriptor $x_i$, a weight range of the local feature descriptor under each clustering cluster is between 0 and 1. The highest weight may be understood that the feature is closest to the clustering center, and a low weight indicates the feature is away from the clustering center. When $\alpha$ approaches positive infinity $+\infty$, formula (2) represents the original VLAD structure.

Further, the formula (2) may be expanded for the square, and the following formula may be obtained:

$$\bar{a}_k(x_i) = \frac{e^{w_k^T x_i + b_k}}{\sum_{k'} e^{w_{k'}^T x_i + b_{k'}}}, \quad (3)$$

where $w_k = 2\alpha c_k$, and $b_k = -\alpha\|c_k\|^2$.

The formula (3) is substituted into the formula (1) to obtain the final VLAD feature vectors:

$$V(j,k) = \sum_{i=1}^{N} \frac{e^{w_k^T x_i + b_k}}{\sum_{k'} w_{k'}^T x_i + b_{k'}} (x_i(j) - c_k(j)) \quad (4)$$

It can be seen from the above derivation that the parameters $w_k$, $b_k$, and $c_k$ in formula (4) all can be trained. The NetVLAD can effectively aggregate first-order residual statistics of different parts (clusters) in the local feature space through the above soft assignment method on different clusters. In addition, the NetVLAD includes three parameters $w_k$, $b_k$, and $c_k$, which causes the NetVLAD to be more flexible than the conventional VLAD method with only one parameter, and all of the parameters can be obtained through learning in an end-to-end manner under specific tasks.

As shown in FIG. 4, in step 470, dimensionality reduction is performed on the feature vectors to obtain corresponding compressed representation vectors.

As described in the previous embodiment, due to the different processes, the conventional PCA cannot be directly connected to the CNN model for training. Therefore, in some embodiments, in step 470, the following NetPCA first provided by this application may be used to perform local feature aggregation.

The embodiment of this application provides for the first time a proposal that a neural network is used to simulate the function of the PCA, that is, NetPCA. The core idea of NetPCA is to project an image onto an orthogonal feature space, so that elements of the image representation is linearly independent, thereby greatly compressing the redundant information in the image representation. Unlike traditional PCA where the direction of the projection matrix is different based on principal component directions obtained through calculation (refer to the description in step 350), NetPCA obtains the direction of the projection matrix through end-to-end training.

In some embodiments, NetPCA is disposed as a fully connected layer in the entire CNN model. The layer is used for receiving the inputted feature vectors obtained in step 450 and has a preset quantity of neurons. The quantity of neurons is equal to a compression target dimensionality L (that is, the second dimensionality) of the feature vectors, which can be set as required. In addition, the weight of each of the neurons is constrained to be a unit vector, and the weights between the neurons satisfy an orthogonal relationship, so as to ensure that the compressed image features are in a unit orthogonal space.

Through the above network design, NetPCA can project the feature vectors obtained in step 450 onto the unit orthogonal feature space to a compressed representation vectors having a target dimensionality.

Figure 5:
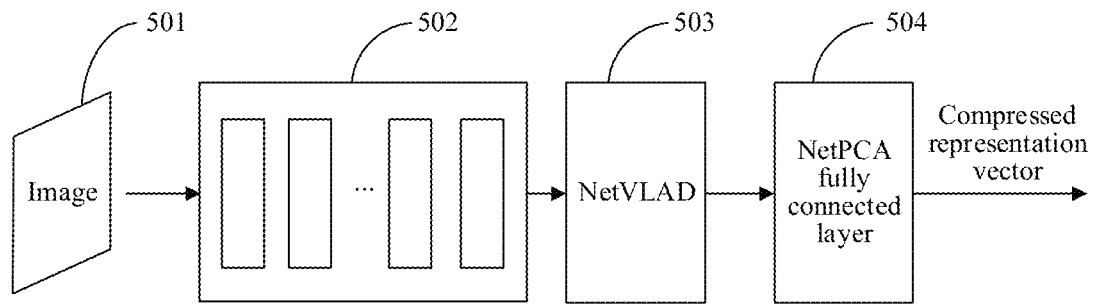
FIG. 5 is a schematic diagram of a basic network structure according to an embodiment shown in FIG. 4.

FIG. 5 shows a basic network architecture of the CNN model corresponding to steps 430-470. As shown in FIG. 5, an image 501 first passes through a VGGNet 502, and local features of the image are extracted. Then K×D-dimensionality feature vector representation is obtained through the local feature aggregation of a NetVLAD 503. After dimensionality reduction is performed on a NetPCA fully connected layer 504, an L-dimensionality compressed representation vector is finally outputted.

The image 501 herein is sample images in the model training process of this embodiment, and is a to-be-queried image in the subsequent model application process (that is, a place recognition application process).

As shown in FIG. 4, in step 490, a CNN model meeting the preset condition is obtained through model parameter training.

For example, the network structure described in steps 430-470, in the CNN model provided in this embodiment of this application, the trainable parameters include weight matrices of three parts: VGGNet, NetVLAD, and NetPCA.

In order to cause the trained CNN model to be adapted to the place recognition task, the embodiment of this application constructs a reasonable loss function.

In some embodiments, the above sample images include a first image, a plurality of second images taken at the same place as the first image, and a plurality of third images taken at the same place as the first image. The above feature vectors include a first feature vector corresponding to the first image, a second feature vector corresponding to the second image, and a third feature vector corresponding to the third image. During training of the CNN model, a loss function of the CNN model is constructed based on first distances and second distances. The first distances are distances between the first feature vector and the second feature vector, and the second distances are distances between the first feature vector and the third feature vector.

In some embodiments, for a specific image (a first image) q in the sample image, an image in the sample images of which a distance from a geographic location is less than a first threshold (which may be regarded as the same taking place) may be set as a potential positive sample $p_i^q$, and an image in the sample images of which a distance from the geographic location is greater than a second threshold (which may be regarded as a different taking place) is set as a negative sample $n_j^q$. In this way, a training sample $(q, p_i^q, n_j^q)$ of a triplet may be obtained.

For a triple (q, $p_i^q$, $n_j^q$) of each image, at least one best matching image $p_{i*}^q$ exists in the potential positive sample $p_i^q$ of the image, which satisfies the minimum distance d between the geographic location and the first image, that is:

$$p_{i*}^q = \mathrm{argmin}_{p_i^q} d(q, p_i^q) \quad (5)$$

In some embodiments, a training objective of the model may be designed such that such a compressed representation vector can be outputted for each sample image, so that the distance between q and the best matching image $p_{i*}^q$ is less than the distance between q and all negative samples $n_j^q$, that is:

$$d(q, p_{i*}^q) < d(q, n_j^q), \forall j \quad (6)$$

Based on the above training objective, in some embodiments, a triple ordering loss function may be defined, as shown in the following formula:

$$L = \sum_j l\left(\min_i d^2(q, p_i^q) + m - d^2(q, n_j^q)\right) \quad (7)$$

L is a loss function, m is a boundary constant, and l represents the maximum boundary loss (also referred to as a hinge loss). In other words, l(x)=max (x, 0).

It can be seen from the formula (7) that in the above embodiment, the loss function is defined as a sum of individual losses for negative sample images $n_j^q$. For each of the negative sample images, when the distance between the specific image q and the negative sample images is greater than the distance between the specific image q and the best matching image $p_{i*}^q$ and the difference exceeds the preset boundary, the loss is zero. Conversely, when the difference does not satisfy the preset boundary, the loss is proportional to the difference.

In some embodiments, in order to constrain the weights between the neurons in NetPCA to satisfy the orthogonal relationship, an orthogonal constraint term may be further added to the above loss function. The orthogonal constraint term is obtained through the weight matrix of each of the neurons and the known unit vector.

In some embodiments, the orthogonal constraint term G is as follows:

$$G = \mathrm{sum}(g(W^T W - E)) \quad (8)$$

W is the weight matrix of the neuron, T represents matrix transposition, E is the known unit vector, g represents squaring of elements of the matrix, and sum represents summation.

In this way, the optimal projection direction of NetPCA for the feature vectors may be determined through end-to-end training. When the training meets the preset convergence condition, the weight W of the neuron is the determined optimal projection direction.

Figure 6:
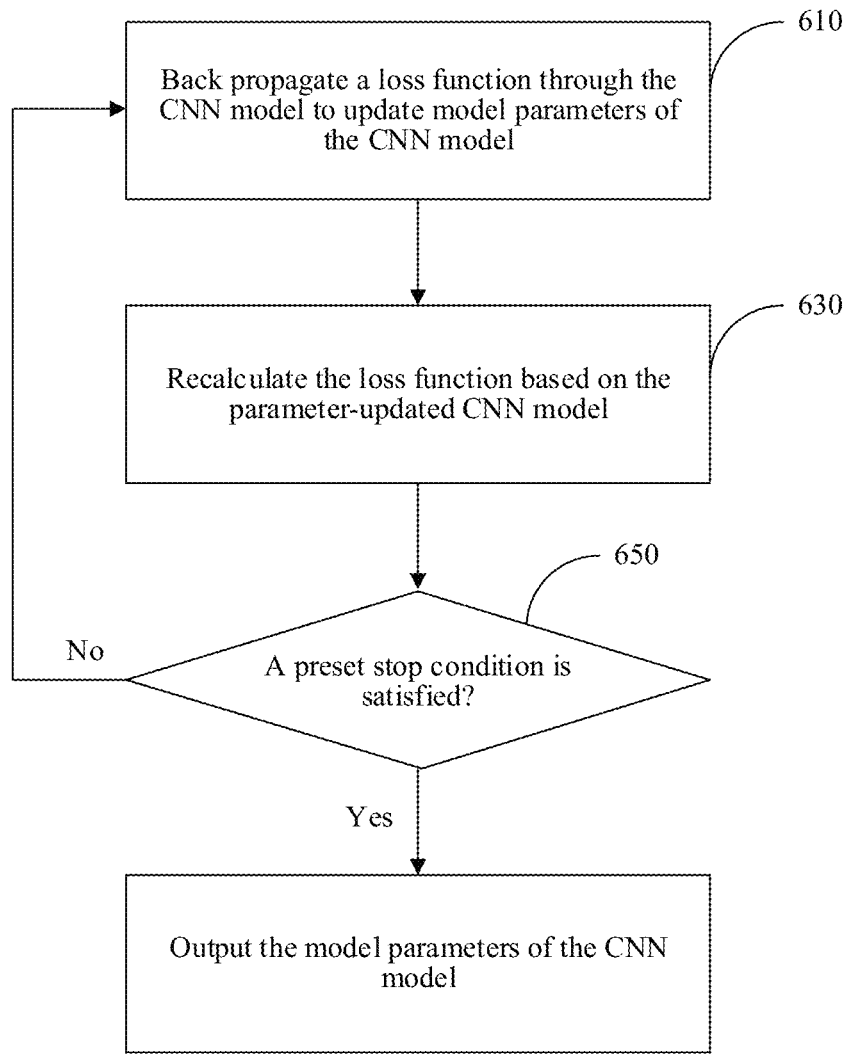
FIG. 6 is a schematic flowchart of step 490 in the embodiment shown in FIG. 4.

In some embodiments, based on the above loss function of the added orthogonal constraint term G, in step 490, a standard stochastic gradient descent algorithm (SGD) may be used for CNN training. An example is shown in FIG. 6, including the following steps 610-650.

In step 610, a loss function is back propagated through the CNN model to update model parameters of the CNN model.

The typical CNN structure including the convolutional layer, the pooling layer, and the fully connected layer is given by way of example. In addition to the random or fixed parameter matrix used for the pooling layer, the weight parameter matrices of the convolutional layer and the fully connected layer may be updated based on the backpropagation of the loss in the training process of the CNN. In terms of the network structure of the embodiment of this application, in the entire CNN model, the weight parameter matrices in the first part used for local feature extraction, the second part used for feature aggregation, and the third part used for dimensionality reduction may be updated based on the backpropagation of the loss in the training process of the CNN.

In addition, for the CNN model during initialization (no inputted data yet), the weight parameter matrices of the convolutional layer and the fully connected layer may be initialized by using some different small random numbers. For example, convolution kernels of all of the convolution layers may be initialized according to Gaussian distribution with 0 as the mean value and 0.01 as the variance.

In step 630, the loss function is recalculated based on the parameter-updated CNN model.

After the model parameters are updated in step 610, the above steps 430-470 may be performed again to perform extraction of the local features and aggregation and dimensionality reduction of feature vectors and perform loss calculation based on the constructed loss function again.

In step 650, it is determined whether a preset stop condition is satisfied, and if so, the model parameters of the CNN model are outputted; or otherwise, step 610 is performed.

According to the training performance of the model, different preset stop conditions may be set for step 650. For example, a count threshold may be set to control a quantity of iterations of training, a loss threshold may also be set as a preset stop condition, and the convergence threshold of a model parameter may also be set as the preset stop condition. The embodiments of this application are not limited thereto.

Based on the model training method provided in the embodiments of this application, by introducing a compression process capable of parameter training to the CNN model, end-to-end training of the place recognition model can be truly implemented. The obtained CNN model can directly obtain low-dimensionality image features, thereby improving the performance of place recognition.

In the above embodiment, this application provides a differentiable feature compression layer NetPCA used for compressing the features in the CNN model. Based on the NetPCA layer, the entire CNN model for place recognition can truly achieve end-to-end training, and the finally trained CNN model can directly obtain image features with a low dimensionality, high discrimination, and good generalization. In addition, integrating the NetPCA into CNN model training can significantly reduce the computational overhead and greatly reduce the risk of the algorithm falling into over-fitting compared with feature compression as a post-processing step of the model.

Figure 7:
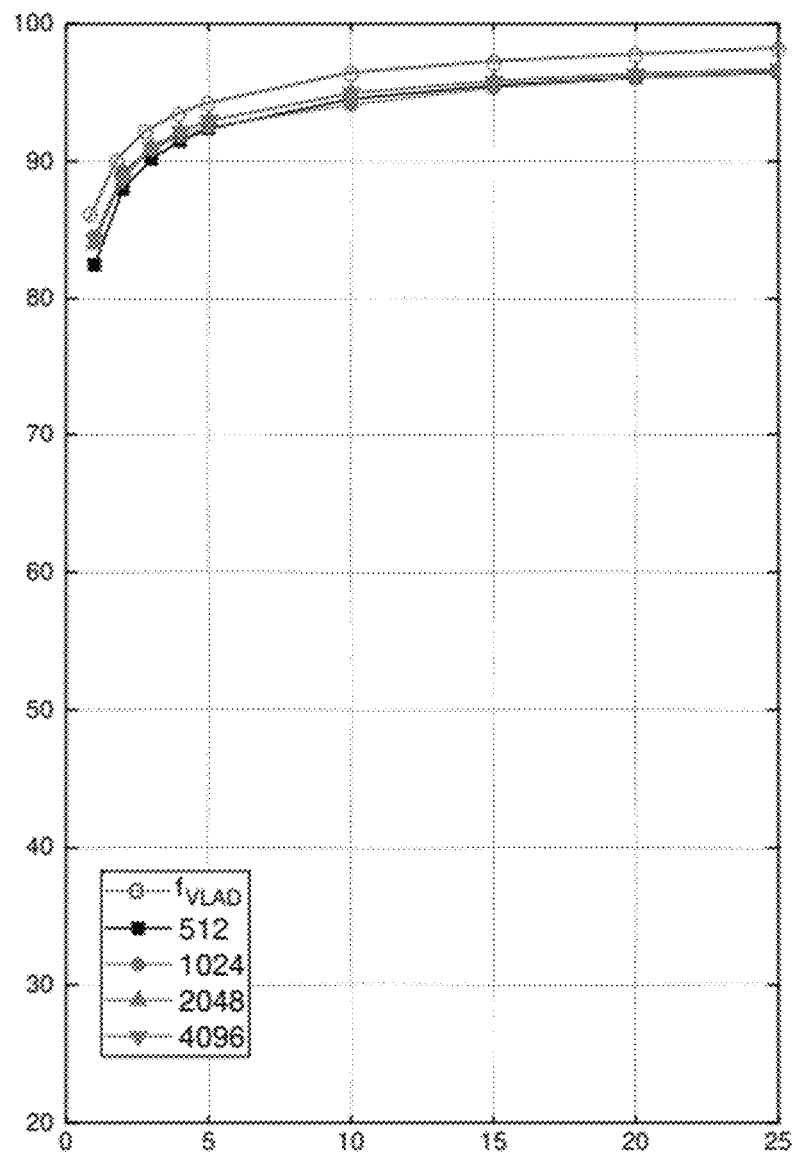
FIG. 7 to FIG. 8 exemplarily show performance comparison of a place recognition model in the embodiment of this application with that in the related art.
Figure 8:
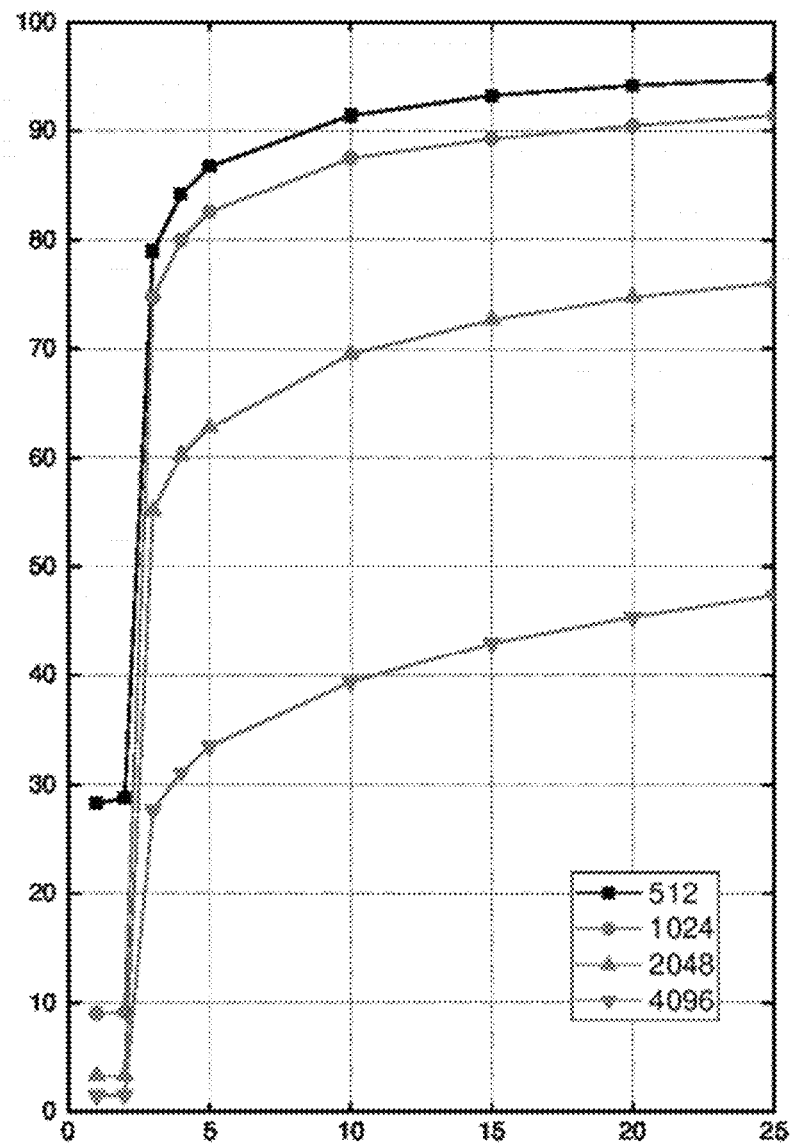

FIG. 7 to FIG. 8 exemplarily show performance comparison of a place recognition model in this application with that in the related art. A curve corresponding to fvLAD in FIG. 7 represents performance of the NetVLAD with a 32k dimensionality. The curves corresponding to the numbers 512, 1024, 2048, and 4096 respectively represent performance of place recognition model (NetVLAD+NetPCA) based on the embodiment of this application when the dimensionality of the compressed representation vectors (that is, the second dimensionality) is respectively set to 512, 1024, 2048, and 4096. The curves corresponding to the numbers 512, 1024, 2048, and 4096 in FIG. 8 respectively represent the performance when the traditional PCA method is used to compress the 32k-dimensionality image features outputted by the NetVLAD to dimensionality of 512, 1024, 2048, and 4096. Two figures are drawn based on the test set of Pitts250k. The abscissa represents a quantity of best matching items in the data set, and the ordinate represents a recall ratio (also referred to as the recall rate, in %).

It can be seen from FIG. 7 that, based on the place recognition model of the embodiment of this application, even if the output dimensionality of the NetPCA is set to 512, performance equivalent to the 32k-dimensionality image feature of the NetVLAD is still presented. It can be seen that the embodiment of this application can achieve performance equivalent to that of the NetVLAD with a significantly reduced computational overhead, so that image features with high discrimination can be obtained through end-to-end training.

It can be seen through comparison of FIG. 7 with FIG. 8 that, when the output dimensionality is the same, the place recognition model of the embodiment of this application is significantly better than the performance of the conventional PCA dimensionality reduction after the NetVLAD.

Figure 9:
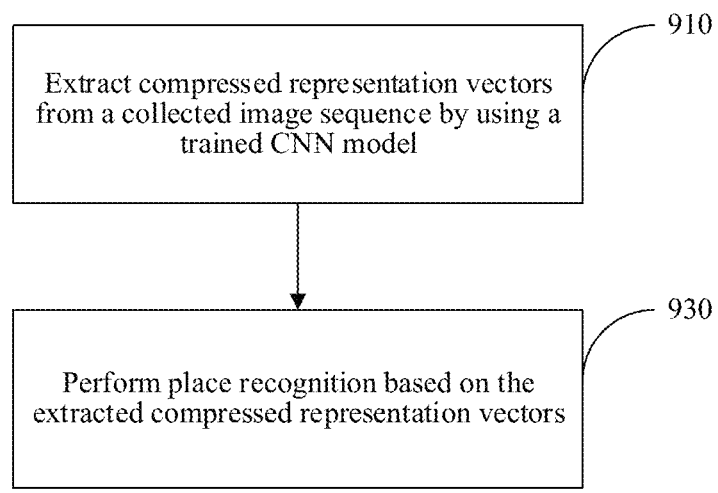
FIG. 9 is a flowchart of a method for place recognition according to an exemplary embodiment.

FIG. 9 is a flowchart of a method for place recognition according to an exemplary embodiment. As shown in FIG. 9, the method for place recognition may be performed by any computing device, and may include the following steps 910 to 930.

In step 910, compressed representation vectors are extracted from a collected image sequence by using a trained CNN model.

The CNN model herein used in step 910 may be obtained through the training according to the method for training a place recognition model described in any of the foregoing embodiments.

In step 930, the place recognition is performed based on the extracted compressed representation vectors.

Figure 10:
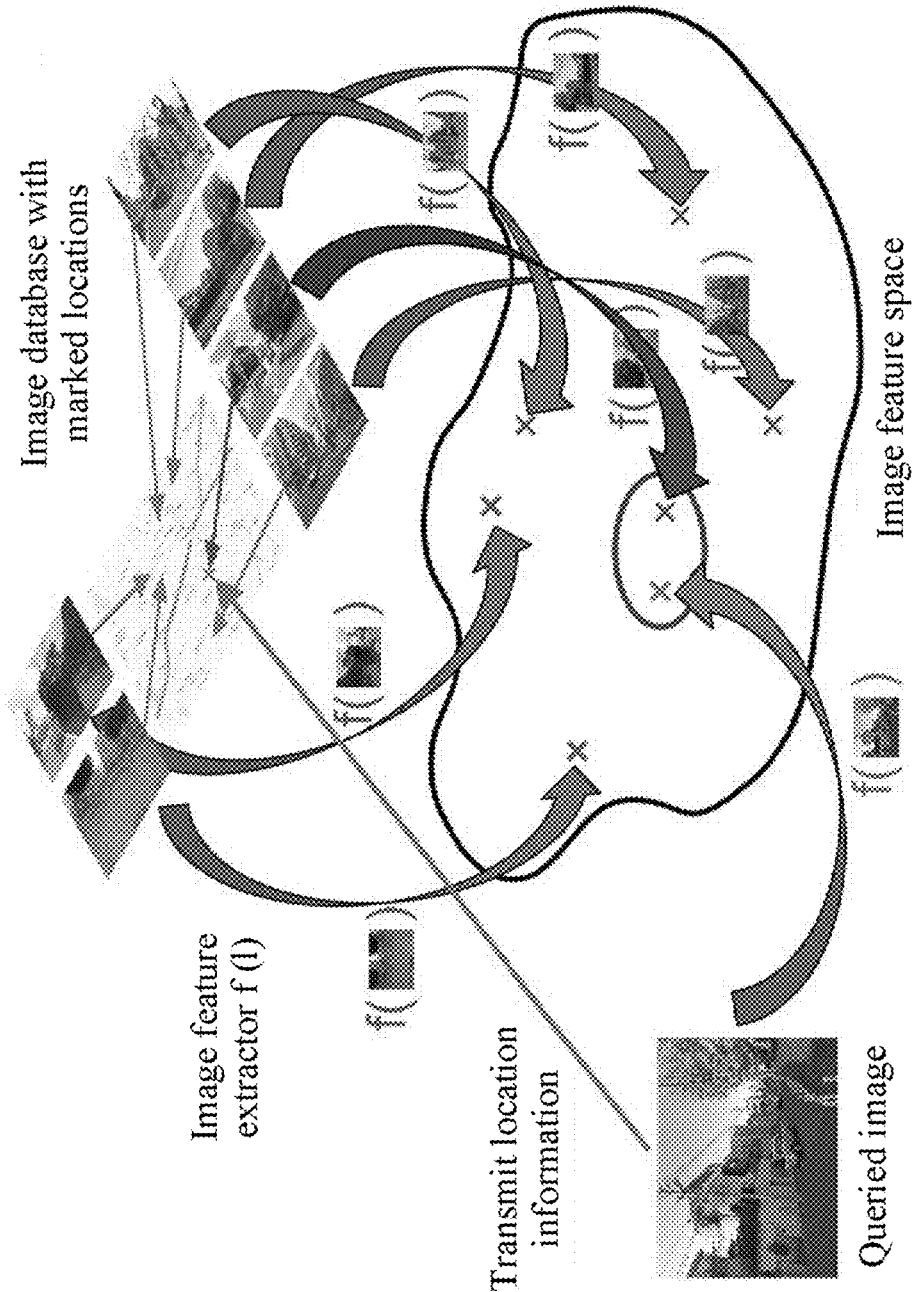
FIG. 10 is a schematic implementation scene diagram of step 920 in the embodiment shown in FIG. 9.

Place recognition is to recognize a spatial location corresponding to the queried image. For the implementation of step 930, reference may be made to the schematic diagram of FIG. 10. Through step 910, the CNN model performs local feature extraction and aggregation and dimensionality reduction processing on the inputted image (simplified as an image feature extractor in FIG. 10), and finally obtains the compressed representation vector f of the image, thereby projecting both the image database with marked locations and the to-be-queried image onto the image feature space. Then, similarities between the compressed representation vectors of the to-be-queried image and the compressed representation vectors of the sample images in the database are calculated. When the similarity between the to-be-queried image and the most similar image in the database meets a certain threshold, it is considered that a location of the image in the database is the location of the to-be-queried image.

Based on the method for place recognition provided in the embodiments of this application, by introducing a compression process capable of parameter training to the CNN model, end-to-end training of the place recognition model can be truly implemented. The obtained CNN model can directly obtain low-dimensionality image features, thereby improving the performance of place recognition.

The following are embodiments of apparatuses of this application, which may be used for performing the embodiments of the model training method and the method for place recognition of this application. For details not disclosed in the embodiments of apparatuses of this application, reference may be made to the embodiments of the model training method and the method for place recognition of this application.

Figure 11:
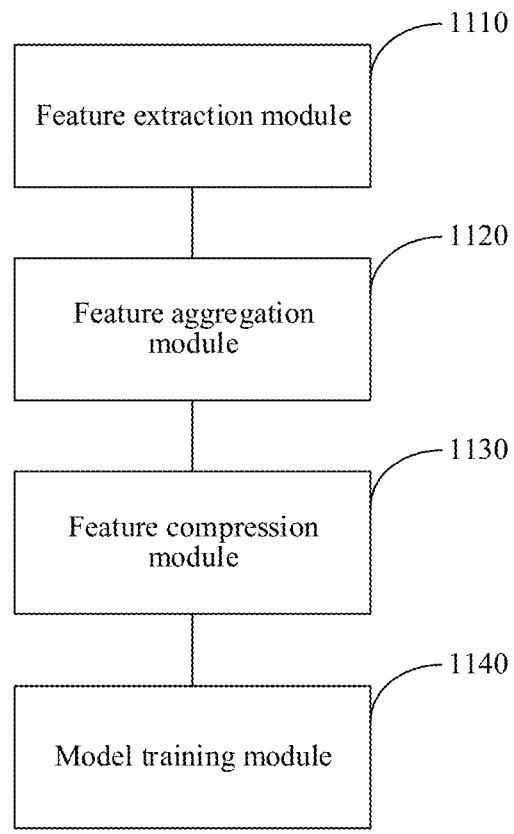
FIG. 11 is a block diagram of an apparatus for training a place recognition model according to an exemplary embodiment.

FIG. 11 is a block diagram of an apparatus for training a place recognition model according to an exemplary embodiment. The model training apparatus, as shown in FIG. 11, includes but is not limited to: a feature extraction module 1110, a feature aggregation module 1120, a feature compression module 1130, and a model training module 1140.

The feature extraction module 1110 is configured to extract local features of sample images based on a first part of a convolutional neural network (CNN) model, the sample images including at least one set of a plurality of images taken at the same place.

The feature aggregation module 1120 is configured to aggregate the local features into feature vectors having a first dimensionality based on a second part of the CNN model.

The feature compression module 1130 is configured to obtain compressed representation vectors of the feature vectors based on a third part of the CNN model, the compressed representation vectors having a second dimensionality less than the first dimensionality; and The model training module 1140 is configured to with an aim of minimizing distances between the compressed representation vectors corresponding to the plurality of images taken at the same place, adjust model parameters of the first part, the second part, and the third part until a CNN model satisfying a preset condition is obtained.

In some embodiments, the feature compression module 1130 is configured to project the feature vectors onto a unit orthogonal space based on the third part to obtain the compressed representation vectors.

In some embodiments, the third part is a fully connected layer in the CNN model that receives the inputted feature vectors, the fully connected layer including a quantity of neurons, the quantity being equal to the second dimensionality, a weight matrix of each of the neurons being a unit vector and having the first dimensionality, and the weight matrices of the neurons satisfying an orthogonal relationship.

In some embodiments, the model training module 1140 is configured to construct a loss function of the CNN model based on an orthogonal constraint term of the weight matrices, the orthogonal constraint term being obtained based on the weight matrices of the neurons and a known unit vector. In some embodiments, the expression of the orthogonal constraint term G is shown in the above formula (8).

In some embodiments, the sample images include a first image, a plurality of second images taken at the same place as the first image, and a plurality of third images taken at a different place from the first image. The feature vectors include a first feature vector corresponding to the first image, a second feature vector corresponding to the second image, and a third feature vector corresponding to the third image. Correspondingly, the model training module 1140 is configured to: construct a loss function of the CNN model based on first distances and second distances, the first distances being distances between the first feature vector and the second feature vector, and the second distances being distances between the first feature vector and the third feature vector; and back propagating the loss function through the CNN model to update the model parameters until the CNN model satisfies a preset convergence condition.

In some embodiments, the loss function constructed by the model training module 1140 is shown in the above formula (7).

In some embodiments, the feature extraction module 1110 is configured to extract the local features of the sample images by using a VGGNet structure.

In some embodiments, the feature aggregation module 1120 is configured to aggregate the local features into the feature vectors by using a NetVLAD structure.

Based on the model training apparatus provided in the embodiments of this application, by introducing a compression process capable of parameter training to the CNN model, end-to-end training of the place recognition model can be truly implemented. The obtained CNN model can directly obtain low-dimensionality image features, thereby improving the performance of place recognition.

Figure 12:
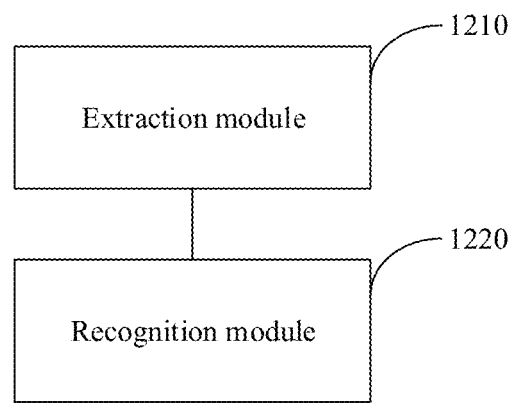
FIG. 12 is a block diagram of an apparatus for place recognition according to an exemplary embodiment.

FIG. 12 is a block diagram of an apparatus for place recognition according to an exemplary embodiment. The apparatus for place recognition, as shown in FIG. 12, includes but is not limited to: an extraction module 1210 and a recognition module 1220.

The extraction module 1210 is configured to extract compressed representation vectors from collected images by using a trained CNN model. The CNN model herein used in the extraction module 1210 may be obtained through the training according to the apparatus for training a place recognition model described in any of the foregoing embodiments.

The recognition module 1220 is configured to perform the place recognition based on the compressed representation vectors extracted by the extraction module 1210.

In some embodiments, the extraction module 1210 uses the trained CNN model to perform local feature extraction and aggregation and dimensionality reduction processing on the inputted image, and finally obtains the compressed representation vector f of the image, thereby projecting both the image database with marked locations and the to-be-queried image onto the image feature space. Then, the recognition module 1220 calculates similarities between the compressed representation vectors of the to-be-queried image and the compressed representation vectors of the sample images in the database. When the similarities between the to-be-queried images and the most similar image in the database meet a certain threshold, it is considered that a location of the image in the database is the location of the to-be-queried image.

Based on the method for place recognition provided in the embodiments of this application, by introducing a compression process capable of parameter training to the CNN model, end-to-end training of the place recognition model can be truly implemented. The obtained CNN model can directly obtain low-dimensionality image features, thereby improving the performance of place recognition.

For the apparatus in the foregoing embodiments, a specific manner in which each module performs an operation is already described in detail in the embodiments related to the method, and details are not described herein again.

Although several modules or units of a device for action execution are mentioned in the foregoing detailed descriptions, the division is not mandatory. In practice, according to the implementations of this application, the features and functions of two or more modules or units described above may be embodied in one module or unit. On the contrary, the features and functions of one module or unit described above may be further divided to be embodied by a plurality of modules or units. The parts displayed as modules or units may or may not be physical units, that is, may be located in one place or may be distributed on a plurality of network units. The objectives of the solutions of the present disclosure may be implemented by selecting some or all of the modules according to actual needs.

Through descriptions of the foregoing implementations, it is easy for a person skilled in the art to understand that the exemplary implementations described herein can be implemented by software or by combining software with necessary hardware. Therefore, the technical solutions of the embodiments of this application may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this application.

After considering the specification and practicing the present disclosure, a person skilled in the art may easily conceive of other implementations of this application. This application is intended to cover any variations, uses or adaptive changes of this application. Such variations, uses or adaptive changes follow the general principles of this application, and include well-known knowledge and conventional technical means in the art that are not disclosed in this application. The specification and the embodiments are considered as merely exemplary, and the scope and spirit of this application are pointed out in the following claims.

It is to be understood that this application is not limited to the precise structures described above and shown in the accompanying drawings, and various modifications and changes can be made without departing from the scope of this application. The scope of this application is subject only to the appended claims.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs place recognition and/or training. In practical application, the foregoing functions may be allocated to and completed by different functional modules according to requirements, that is, an inner structure of a device is divided into different functional modules to implement all or a part of the functions described above.

What is claimed is:

1. A method for training neural networks, performed by a computer device, the method comprising:
extracting local features of sample images based on a first part of a convolutional neural network (CNN) model, the sample images comprising a first image, a plurality of second images taken at the same place as the first image, and a plurality of third images taken at a different place from the first image;
aggregating the local features into feature vectors having a first dimensionality based on a second part of the CNN model, the feature vectors including a first feature vector corresponding to the first image, second feature vectors corresponding to the second images, and third feature vectors corresponding to the third images;
obtaining compressed representation vectors of the feature vectors based on a third part of the CNN model, the compressed representation vectors having a second dimensionality less than the first dimensionality; and
training the CNN model, including adjusting model parameters of the first, second, and third parts of the CNN model based on the compressed representation vectors, the adjusting including:
constructing a loss function of the CNN model based on first distances and second distances, the first distances being distances between the first feature vector and the second feature vectors, and the second distances being distances between the first feature vector and the third feature vectors; and
back propagating the loss function through the CNN model to update the model parameters until the updated CNN model satisfies a preset convergence condition.

2. The method according to claim 1, wherein training the CNN model comprises minimizing respective distances between at least a subset of the compressed representation vectors corresponding to the second plurality of images taken at the same place as the first image.

3. The method according to claim 1, wherein obtaining the compressed representation vectors further comprises:
projecting the feature vectors onto a unit orthogonal space based on the third part to obtain the compressed representation vectors.

4. The method according to claim 3, wherein the third part is a fully connected layer in the CNN model that receives the feature vectors, the fully connected layer comprising a quantity of neurons, the quantity being equal to the second dimensionality, a weight matrix of each of the neurons being a unit vector and having the first dimensionality, the weight matrices of the neurons satisfying an orthogonal relationship.

5. The method according to claim 4, wherein adjusting the model parameters of the first part, the second part, and the third part comprises:
constructing a loss function of the CNN model based on an orthogonal constraint term of the weight matrices, the orthogonal constraint term being obtained based on the weight matrices of the neurons and a known unit vector.

6. The method according to claim 1, wherein constructing the loss function comprises constructing the loss function as $$L = \sum_j l\left(\min_i d^2(q, p_i^q) + m - d^2(q, n_j^q)\right)$$

wherein L is the loss function, l is a maximum boundary loss, q is the first feature vector, $p_i^q$ is an ith one of the second feature vectors, $n_j^q$ is a $j^{th}$ one of the third feature vectors, m is a boundary constant, d represents vector distance calculation, and min represents minimum value calculation.

7. The method according to claim 1, wherein extracting the local features of sample images comprises:
extracting the local features of the sample images by using a visual geometry group network (VGGNet) structure.

8. The method according to claim 1, wherein aggregating the local features into feature vectors comprises:
aggregating the local features into the feature vectors by using a vector of locally aggregated descriptors network (NetVLAD) structure.

9. A computer device, comprising:
one or more processors; and
memory storing one or more programs, that, when executed by the one or more processors, cause the one or more processors to perform operations comprising:
extracting local features of sample images based on a first part of a convolutional neural network (CNN) model, the sample images comprising a first image, a plurality of second images taken at the same place as the first image, and a plurality of third images taken at a different place from the first image;
aggregating the local features into feature vectors having a first dimensionality based on a second part of the CNN model, the feature vectors including a first feature vector corresponding to the first image, second feature vectors corresponding to the second images, and third feature vectors corresponding to the third images;
obtaining compressed representation vectors of the feature vectors based on a third part of the CNN model, the compressed representation vectors having a second dimensionality less than the first dimensionality;
training the CNN model, including adjusting model parameters of the first, second, and third parts of the CNN model based on the compressed representation vectors, the adjusting including:
constructing a loss function of the CNN model based on first distances and second distances, the first distances being distances between the first feature vector and the second feature vectors, and the second distances being distances between the first feature vector and the third feature vectors; and
back propagating the loss function through the CNN model to update the model parameters until the updated CNN model satisfies a preset convergence condition.

10. The computer device according to claim 9, wherein training the CNN model comprises minimizing respective distances between at least a subset of the compressed representation vectors corresponding to the second plurality of images taken at the same place as the first image.

11. The computer device according to claim 9, wherein obtaining the compressed representation vectors further comprises:
projecting the feature vectors onto a unit orthogonal space based on the third part to obtain the compressed representation vectors.

12. The computer device according to claim 11, wherein the third part is a fully connected layer in the CNN model that receives the feature vectors, the fully connected layer comprising a quantity of neurons, the quantity being equal to the second dimensionality, a weight matrix of each of the neurons being a unit vector and having the first dimensionality, the weight matrices of the neurons satisfying an orthogonal relationship.

13. The computer device according to claim 12, wherein adjusting the model parameters of the first part, the second part, and the third part comprises:
constructing a loss function of the CNN model based on an orthogonal constraint term of the weight matrices, the orthogonal constraint term being obtained based on the weight matrices of the neurons and a known unit vector.

14. The computer device according to claim 9, wherein constructing the loss function comprises constructing the loss function as $$L = \sum_j l\left(\min_i d^2(q, p_i^q) + m - d^2(q, n_j^q)\right)$$

wherein L is the loss function, l is a maximum boundary loss, q is the first feature vector, $p_i^q$ is an $i^{th}$ one of the second feature vectors, $n_j^q$ is a $j^{th}$ one of the third feature vectors, m is a boundary constant, d represents vector distance calculation, and min represents minimum value calculation.

15. A non-transitory computer readable storage medium storing instructions that, when executed by one or more processors of a computer device, cause the one or more processors to perform operations comprising:
extracting local features of sample images based on a first part of a convolutional neural network (CNN) model, the sample images comprising a first image, a plurality of second images taken at the same place as the first image, and a plurality of third images taken at a different place from the first image;
aggregating the local features into feature vectors having a first dimensionality based on a second part of the CNN model, the feature vectors including a first feature vector corresponding to the first image, second feature vectors corresponding to the second images, and third feature vectors corresponding to the third images;
obtaining compressed representation vectors of the feature vectors based on a third part of the CNN model, the compressed representation vectors having a second dimensionality less than the first dimensionality;
training the CNN model, including adjusting model parameters of the first, second, and third parts of the CNN model based on the compressed representation vectors, the adjusting including:
constructing a loss function of the CNN model based on first distances and second distances, the first distances being distances between the first feature vector and the second feature vectors, and the second distances being distances between the first feature vector and the third feature vectors; and
back propagating the loss function through the CNN model to update the model parameters until the updated CNN model satisfies a preset convergence condition.

16. The non-transitory computer readable storage medium according to claim 15, wherein training the CNN model comprises minimizing respective distances between at least a subset of the compressed representation vectors corresponding to the second plurality of images taken at the same place as the first image.

17. The non-transitory computer readable storage medium according to claim 15, wherein obtaining the compressed representation vectors further comprises:
projecting the feature vectors onto a unit orthogonal space based on the third part to obtain the compressed representation vectors.

18. The non-transitory computer readable storage medium according to claim 17, wherein the third part is a fully connected layer in the CNN model that receives the feature vectors, the fully connected layer comprising a quantity of neurons, the quantity being equal to the second dimensionality, a weight matrix of each of the neurons being a unit vector and having the first dimensionality, the weight matrices of the neurons satisfying an orthogonal relationship.

* * * * *